Patented Sept. 7, 1954

2,688,597

UNITED STATES PATENT OFFICE 2,688,597

PROCESS FOR PREPARING INSULATING OIL COMPOSITION

Anthony Fred Doran Pott, London, and Donald Henry McLean, Kennington, England, assignors to Standard Oil Development Company, a corporation of Delaware No Drawing. Application June 16, 1951, Serial No. 232,053

Claims priority, application Great Britain July 7, 1950

4 Claims. (Cl. 252—64)

The present invention relates to an improved process for treating mineral oils with adsorbent. Included in the class of oils for which the invention is particularly suited are insulating oils and oils suitable for lubricating steam turbines. In general it is applicable to all mineral oils the manufacture of which includes the step of adsorbent treatment.

Insulating oils are generally used alone, or in combination with laminar materials such as paper, to separate bodies between which there is a potential difference and between which, in the absence of the insulation, a considerable electric discharge would take place.

The physical properties of the oil for this service vary with the particular application. The viscosity, for example, may, in some cases, be low in order to permit heat dissipation by convection while in other cases it may be high in order to minimize any flow that may occur under gravity or other forces. Where particularly high viscosity is required it is common to blend the oil with thickeners such as petrolatum, waxes, rosins, hydrocarbon polymers, e. g. polybutenes, and oxygen containing polymers, e. g. polymethyl methacrylate.

The power factor and resistivity of a clean insulant are its most important electrical properties as they indicate the losses that will occur, in the dielectric and by conduction, respectively. These properties are amenable to improvements by refining and, in general, an improvement in one leads to a corresponding improvement in the other.

Steam turbine oils are required primarily to lubricate the moving surfaces of steam turbines. They may also be required to function as hydraulic media, coolants or sealing fluids. The oils may come into contact with water or steam and it is necessary that they do not form stable aqueous emulsions. These oils remain in the equipment for long periods and they are required to be relatively stable from the point of view of sludge and acidity development and their demulsibility must not rapidly deteriorate. They must also have low corrosivity towards the metals encountered in the turbine system.

It has for a long time been the practice to treat insulating oils and turbine oils with adsorbent materials such as activated clay, alumina, silica or carbon. This treatment may be by percolation or contacting and is normally followed by filtration. In either case the process is accelerated by reducing the viscosity of the oil by heat or other means. It is known that full advantage of the treatment is not obtained if the oil can oxidize in the process as the oxidation products are normally of high power factor and low resistivity. For this reason it is common practice to blanket the oil during the treatment with an inert atmosphere such as nitrogen, carbon dioxide or steam. This blanketing is costly, inconvenient and, particularly in the filtration stage, sometimes ineffective.

Oxidation may also occur to a greater or lesser extent during treatment if the adsorbent is not itself free from air. In this case oxidation probably occurs on the large surface presented by the clay. This can often be reduced if elaborate and expensive arrangements are made to free the adsorbent from air.

It has now been discovered that effective power factor reduction and demulsification improvement of an oil or oil blend can be achieved by treatment with an absorbent material even in the absence of an inert gaseous blanket, and at high temperature, by incorporating in the oil before it is treated a small proportion of an oxidation inhibitor.

This process can be used for treatment at temperatures ranging up to 250° C. although temperatures of 50° C. to 200° C. and more particularly 100°–150° C. are preferred.

The oil treated by this invention may be a light mineral oil such as the impregnant in the "Pirelli-type" cable or it may be a heavier oil such as is used for impregnating "solid-filled" cables. It can be a more or less paraffinic oil such as a turbine oil or it can be a blend comprising mineral oil, and an oil soluble thickener such as petrolatum, wax, rosin, hydrocarbon polymers such as polybutene and oxygen containing polymers such as polymethyl methacrylate. Preferably it is a mineral oil of up to 70 centistokes kinematic viscosity at 210° F. and more particularly in the case of a cable insulating oil it has a kinematic viscosity between 25 and 40 centistokes at 210° F., and, in the case of a turbine oil, it has a kinematic viscosity between 25 and 100 cs. at 100° F.

The absorbent material used can be an activated clay, carbon, silica, alumina, silica/magnesia or the like. Preferably it is an activated earth or clay, in particular montmorillonite, Attapulgus clay or Florida earth. The adsorbent may be used in proportions up to 20% by weight and the amount used will depend on the initial characteristics of the oil and the characteristics required in the treated product. Generally less than 10% will effect an adequate improvement and preferably less than 5% adsorbent is used.

The duration of the treatment is again a function of the product required and the quality of the feed. It can be up to 10 hours but it is preferably up to 4 hours, e. g. 2 hours.

The oxidation inhibitors that may be used should be oil-soluble. They include the phenols, such as phenol, bis-phenol, naphthols and alkylated phenols, particularly tri-alkyl phenols, organic amines, including phenolic amines, organic nitro compounds, organic sulfur compounds, such as thio-alcohols, thio-ethers, xanthates and thio-phosphates.

The proportion of inhibitor to be used depends on its potency. Where the inhibitor is adsorbed on the adsorbent material used the quantity employed is preferably such that at the end of the treatment there is still sufficient remaining in the oil to inhibit oxidation. This is not necessary, however, where the oil does not have to be oxidation resistant after treatment.

Particularly suitable oxidation inhibitors for this invention are those that do not increase the power factor or reduce the resistivity of the oil. These inhibitors have the further advantage that they are normally not adsorbed to any great extent on the adsorbent used. Examples of such inhibitors are the so-called "hindered" phenols such as 2,4,6 tri-t-butyl phenol, 2-6 di-t-butyl 4-methyl phenol, and 2,2-bis 3,5-di-t-butyl,4-hydroxyphenol pentane.

Table I shows the improvements obtained using this invention when clay treating an oil to reduce its power factor. In this example the inhibitor used is 2,6 di-t-butyl 4-methyl phenol which does not itself affect the power factor of the oil.

TABLE I

[*Treatment at 100° C. for 2 hours of a paraffinic oil (150 Saybolt Universal seconds at 210° F.) with 2% by weight of montmorillonite.*]

| | Power Factor | |
|---|---|---|
| | at 60° F. | at 100° F. |
| 1. Untreated oil | 0.0044 | 0.0494 |
| 2. Contacted according to the prior art | 0.0016 | 0.0172 |
| 3. Treated oil as in 2. plus 0.4% by weight inhibitor | 0.0016 | 0.0151 |
| 4. Contacted after addition of 0.4% by weight inhibitor according to the present invention | 0.0010 | 0.0096 |

It will be seen that the process according to the present invention leads to an oil which has a power factor reduced by almost a half compared to prior art treatment.

Table II shows the advantage obtained from the use of this invention when clay treating an oil to reduce its demulsification number. Comparison of the first two columns shows that 2,6-di-t-butyl, 4-methyl phenol, hereinafter referred to a antioxidant A, when added to an oil that had not been clay treated, increased the demulsibility of the oil before and after oxidation but inhibited acidity production during oxidation. Comparison of the third and fourth columns shows that antioxidant A does not affect the demulsibility of a clay treated oil but tends to inhibit the increase in demulsibility occuring during its oxidation and inhibits acidity production during oxidation. Comparison of the fourth and fifth columns shows that the addition of antioxidant A according to this invention before clay treatment does not affect the final demulsibility obtained by the treatment and gives the same result for demulsibility as in the case where the antioxidant is added after treatment. However, the addition of the antioxidant before the clay treatment step leads to a product that develops less acidity and demulsibility during oxidation than the product obtained by the addition of the antioxidant A to the clay treated oil.

TABLE II

*The effect of 2,6-di-t-butyl 4-methyl phenol on the clay treatment of turbine oil*

| | A | B | C | D | E |
|---|---|---|---|---|---|
| Before Oxidation Test: | | | | | |
| Demulsification Number | 210 | 300 | 60 | 60 | 60 |
| Acidity, mg. KOH/g | 0.09 | 0.10 | 0.04 | 0.05 | 0.07 |
| After Oxidation Test: | | | | | |
| Demulsification Number | 840 | 1,200 | 420 | 390 | 330 |
| Acidity | 0.94 | 0.16 | 0.79 | 0.08 | 0.07 |

The oxidation test was that laid down in the Institute of Petroleum Standard Methods for Testing Petroleum and its Products I. P. 114/47 P. The method for the determination of demulsification number may be found in the same publication, I. P. 19/47.

A is an extracted coastal oil of 90 cs. at 100° F.
B is the same oil with 0.4%, by weight, of antioxidant A
C is oil A treated for 2 hours at 100° C. with 2% by weight of fuller's earth grade MQC
D is oil C plus 0.4% by weight, of antioxidant A added after clay treatment
E is oil B treated with 2% by weight of fuller's earth MQC for 2 hours at 100° C.

An oil prepared by this invention may be blended with oil soluble thickeners which may be waxes, rosins, petrolatum, hydrocarbon polymers, particularly polybutenes, and oxygen containing polymers such as polymethyl methacrylates.

Conventional oil soluble additives such as rust and corrosion inhibitors, e. g. metal naphthenates, sulphonates and $C_{10}$-$C_{20}$ alkyl mercapto $C_1$-$C_6$ aliphatic acids, anti-foaming agents such as polymeric silicones, wear reducing agents such as organic phosphates and thiophosphates, detergents e. g. alkaline earth metal salts of alkyl phenyl sulfides and copper deactivators, which normally form stable insoluble chelates with any of the metal that is in solution, may be added to the oil or oil blend manufactured according to this invention. An example of such a metal deactivator is N:N'disalicylidine 1:2-diamino propane. The addition of these conventional additives will be conditioned by considerations known to the prior art. For example where, in electrical oils, low power factor and high resistivity are required care must be taken not to use additives that will prejudice these properties.

To summarize, the present invention provides an improved method of treating insulating oils with adsorbents wherein the treatment takes place in the presence of an oxidation inhibitor. It may also provde an oil of improved oxidaion resistance properties.

What is claimed is:

1. The process of preparing insulating oils of low power factor and high insulating properties which consists essentially of first treating the oil with 0.05 to 2% of 2,6, di-tertiary butyl, 4-methyl phenol and thereafter contacting said treated oil with a finely divided solid adsorption agent and filtering, said contacting being accomplished at a temperature between 50° and 250° C.

2. Process according to claim 1 wherein said adsorbent comprises a material selected from the group consisting of activated clay, carbon, silica, alumina, and magnesia.

3. Process according to claim 1 wherein said adsorbent is an activated clay.

4. A process according to claim 1 in which the oil is a mineral lubricating oil fraction with a viscosity of up to 70 cs. at 210° F.

References Cited in the file of this patent

UNITED STATES PATENTS

| Number | Name | Date |
|---|---|---|
| 1,793,135 | Rogers | Feb. 17, 1931 |
| 2,202,877 | Stevens | June 4, 1940 |

FOREIGN PATENTS

| Number | Country | Date |
|---|---|---|
| 368,882 | Great Britain | Mar. 17, 1932 |